United States Patent [19]

Schwarz

[11] 3,846,471

[45] Nov. 5, 1974

[54] SEPARATION AND PURIFICATION OF CRUDE 1,4-DICYANO-2-BUTENE

[75] Inventor: Herbert Schwarz, Opladen, Germany

[73] Assignee: Farbenfabriken Bayer Aktiengesellschaft, Leverkusen, Germany

[22] Filed: July 19, 1972

[21] Appl. No.: 273,204

Related U.S. Application Data

[63] Continuation of Ser. No. 73,751, Sept. 21, 1970, abandoned.

[30] Foreign Application Priority Data

Sept. 25, 1969 Germany.............................. 1948458

[52] U.S. Cl.......................................... 260/465.8 R

[51] Int. Cl................... C07c 121/00, C07c 121/30
[58] Field of Search............................. 260/465.8 R

[56] References Cited
FOREIGN PATENTS OR APPLICATIONS
1,263,751  3/1968  Germany.......................... 260/465.8

Primary Examiner—Joseph P. Brust
Attorney, Agent, or Firm—Plumley & Tyner

[57] ABSTRACT

Process for separating and purifying of crude 1,4-dicyano-2-butene obtained by reaction of 1,4-dichloro-2-butene and/or 1,2-dichloro-3-butene with hydrocyanic acid or sodium cyanide in the presence of one copper salt in an aqueous acidic medium by extracting the reaction mixture with methylene chloride.

3 Claims, 1 Drawing Figure

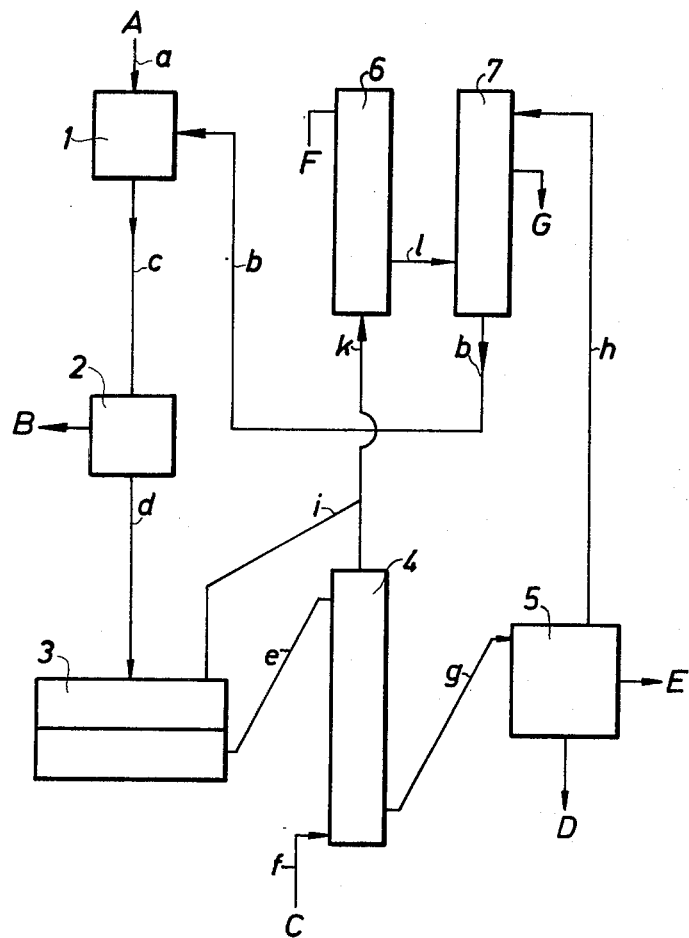

SEPARATION AND PURIFICATION OF CRUDE 1,4-DICYANO-2-BUTENE

This is a continuation, of application, Ser. No. 73,751, filed 9-21-70, and now abandoned.

This invention relates to a continuous process for the separation and purification of crude 1,4-dicyano-2-butene by extraction with methylene chloride.

Processes for the production of 1,4-dicyano-2-butene (dihydromuconic acid dinitrile) are described in German Pat. Specifications 872,941 and 878,942, comprising reacting 1,4-dichloro-2-butene or 1,2-dichloro-3-butene or mixtures of the two with hydrocyanic acid or sodium cyanide in an aqueous acid medium (pH 3 to 4) in the presence of cuprous salts as catalysts.

The end product of this reaction is a two-phase system: an upper oil layer consisting substantially of the crude 1,4-dicyano-2-butene, and an aqueous sodium chloride solution containing the catalyst partly in the form of a solution and partly in the form of a suspension.

While still warm this system is extracted with toluene. The toluene solution is separated off from the aqueous layer, filtered and concentrated by evaporation. The residue is distilled, giving pure colourless 1,4-dicyano-2-butene melting at 76°C (P. Kurtz, Liebigs Ann. Chem. 572, 23 to 82 (1951); 631, 21 to 56 (1960)).

In addition to toluene, other solvents have been suggested as extractants, including, for example, in U.S. Pat. Specification No. 2,557,258, benzene, xylene, carbon tetrachloride, cyclohexane, liquid alkanes, light petroleum and liquid alkenes. It is particularly emphasised in the aforementioned Patent Specification that, although the quantity in which the solvent is employed is by no means critical, it is nevertheless desirable to use a quantity large enough to keep the highly crystallisation-prone 1,4-dicyano-2-butene in solution.

Further work on the purification of the crude 1,4-dicyano-2-butene has surprisingly shown that methylene chloride is an outstanding solvent for the dinitrile.

Accordingly, it is an object of this invention to provide a process for the separation and purification of the crude 1,4-dicyano-2-butene prepared from 1,4-dichloro-2-butene or 1,2-dichloro-3-butene or mixtures of the two by reaction with hydrocyanic acid or sodium cyanide in an aqueous acid medium at a pH value of from 3 to 4 in the presence of a cuprous salt as a catalyst, which comprises extracting the reaction mixture with methylene chloride freeing the resulting methylene chloride solution from copper compounds and recovering the 1,4-dicyanobutene by partial evaporation of the methylene chloride following the crystallisation.

The unique position which methylene chloride occupies in relation to other solvents and which was by no means foreseeable, is clearly apparent from the figures set out in the following tables:

Solubility of 1,4-dicyano-2-butene at 20-22°C

| Solvent | Concentration of nitrile in the solvent (g per 100 g) |
|---|---|
| saturated sodium chloride solution | 0.5 |
| water | 0.8 |
| benzene | 5.0 |
| toluene | 2.5 |
| xylene | 1.0 |
| chlorobenzene | 2.6 |
| ethanol | 2.3 |
| adipic acid dinitrile | 20.0 |
| carbon tetrachloride | <0.5 |
| 1,2-dichloropropane | 5.0 |
| methylene chloride | 25.0 |

Table 2

Dependence of the solubility of 1,4-dicyano-2-butene upon temperature

| Temperature °C | Concentration of nitrile in the solvent (g per 100 g of solvent) | | | |
|---|---|---|---|---|
| | Benzene | Toluene | Adiponitrile | Methylene chloride |
| 5 | | 1.2 | 3 | 12 |
| 10 | 2 | 1.6 | 7 | 15 |
| 20 | 5 | 2.5 | 20 | 25 |
| 30 | 8 | 4.5 | 38 | 38 |
| 40 | | 8.0 | 60 | 60 |

Table 2 also shows that the solubility of 1,4-dicyano-2-butene in methylene chloride is greatest in the temperature range in which the extraction can be carried out particularly easily and which, as tests have shown, gives the most favourable results, i.e., at room temperature.

Methylene chloride has further advantages over the other solvents mentioned in the tables since it is inexpensive and low boiling with little heat of evaporation.

Methylene chloride is also eminently suitable for continuously processing and purifying the crude product accumulating during the preparation of 1,4-dicyano-2-butene.

The methylene chloride solution obtained after extraction can be further purified by conventional methods before the dicyanobutane is isolated.

The 1,4-dicyano-2-butene obtainable from the methylene chloride solution through concentrating the solvent by evaporation crystallises out. These crystals only have to be washed on a suction filter in order to accumulate in such a pure form that there is no need for the complicated and expensive step of distillation.

Accordingly, the purification process using methylene chloride represents a considerable improvement in relation to conventional methods.

The following example is to further illustrate the invention without limiting it.

EXAMPLE 1

A reaction mixture A heated to 80°C which is continuously obtained by reacting dichlorobutene with hydrocyanic acid and which consists of 1000.0 parts by weight of 1,4-dicyano-2-butene, 176.0 parts by weight of secondary products, 3600.0 parts by weight of water, 1178.0 parts by weight of sodium chloride, 9.0 parts by weight of hydrocyanic acid, 1,3 parts by weight of cuprous cyanide and 21.0 parts by weight of insoluble solids, is delivered through the pipe a into the vessel 1 in an apparatus of the kind shown in FIG. 1, stirred with 5500 parts by weight of methylene chloride from pipe b and cooled to 20°C. The mixture is passed through the pipe c over the filter 2 where it is freed from insoluble solids B. It flows through a pipe *d* into the separator 3 where it separates into two layers. The lower layer contains approximately 96 percent of the 1,4-dicyano-2-butene dissolved in methylene chloride and traces of cuprous salts. The solution then flows through a pipe *e* into the extraction column 4 in which the copper is quantitatively removed by treatment with approximately 1 percent aqueous hydrocyanic acid solution C. The copper-free solution finally flows through a pipe *g* into the evaporation and crystallisation section 5, in which pure 1,4-dicyano-2-butene is separated off in the form of a white crystal powder D by evaporation. The mother liquor consists essentially of the secondary products with small quantities of 1,4-dicyano-2-butene E.

The methylene chloride distilling off from 5 is recycled through the pipe *h*, the extraction column 7 and the pipe *b* into the vessel 1.

The upper layer accumulating in the separator 3 consists of a sodium chloride solution in which a little hydrocyanic acid and approximately 4 percent of the 1,4-dicyano-2-butene formed are present in addition to cuprous salts. The solution flows through a pipe *i* and combines with the copper-containing solution issuing from the extraction column 4 through the pipe *k*. The combined aqueous solutions are freed from dissolved hydrocyanic acid F in the steam distillation stage 6 and finally flow through pipe 1 and the extraction column 7 into the effluent G.

The 1,4-dicyano-2-butene present in the aqueous solutions is extracted almost completely from the methylene chloride recovered in the extraction column 7 and returned to the vessel 1. It is possible in this way to obtain 99 percent of the 1,4-dicyano-2-butene formed as a 100 percent pure substance.

What we claim is:

1. In a process for the separation and purification of crude 1,4-dicyano-2-butene prepared from 1,4-dichloro-2-butene or 1,2-dichloro-3-butene or a mixture of the two by reaction with hydrocyanic acid or sodium cyanide in an aqueous acidic medium at a pH value of from 3 to 4 in the presence of a cuprous salt as a catalyst, the improvement which comprises contacting the reaction mixture at room temperature with methylene chloride, cooling the said mixture until it separates into an upper and lower layer, removing copper from said lower layer by treating said layer with an aqueous solution of hydrocyanic acid in an extraction column and recovering the 1,4-dicyanobutene from said treated lower layer by partial evaporation of the methylene chloride in said layer, followed by crystallization.

2. The process of claim 1 wherein said copper compounds are separated from the methylene chloride solution quantitatively by treating the solution with about a 1 percent aqueous solution of hydrocyanic acid.

3. A process for the purification and separation of crude 1,4-dicyano-2-butene from a mixture prepared by reacting dichlorobutene with hydrocyanic acid and which comprises 1000.0 parts by weight of 1,4-dicyano-2-butene, 3600.0 parts by weight of water, 1178.0 parts by weight of sodium chloride, 9.0 parts by weight of hydrocyanic acid and 1.3 parts by weight cuprous cyanide, which consists of contacting said mixture at 80°C. with about 5500 parts by weight of methylene chloride and cooling to 20°C.; separating the cooled mixture into an upper and lower layer and removing copper traces from said lower layer by treating the lower layer in an extraction column with about a 1 percent aqueous solution of hydrocyanic acid; evaporating the copper free solution to remove methylene chloride and obtain pure crystals of 1,4-dicyano-2-butene.

* * * * *